US011194914B2

(12) United States Patent
Yang et al.

(10) Patent No.: US 11,194,914 B2
(45) Date of Patent: Dec. 7, 2021

(54) METHOD AND APPARATUS TO DETECT SECURITY VULNERABILITIES IN A WEB APPLICATION

(71) Applicant: McAfee, LLC, Santa Clara, CA (US)

(72) Inventors: Jin Yang, Shanghai (CN); Yongnian Le, Shanghai (CN); Igor Muttik, Aylesbury (GB); Hong Li, El Dorado Hills, CA (US)

(73) Assignee: McAfee, LLC, San Jose, CA (US)

( * ) Notice: Subject to any disclaimer, the term of this patent is extended or adjusted under 35 U.S.C. 154(b) by 362 days.

(21) Appl. No.: 16/315,615

(22) PCT Filed: Jul. 4, 2016

(86) PCT No.: PCT/CN2016/088397
§ 371 (c)(1),
(2) Date: Jan. 4, 2019

(87) PCT Pub. No.: WO2018/006241
PCT Pub. Date: Jan. 11, 2018

(65) Prior Publication Data
US 2019/0303584 A1 Oct. 3, 2019

(51) Int. Cl.
G06F 21/57 (2013.01)
G06F 16/23 (2019.01)
(Continued)

(52) U.S. Cl.
CPC .............. G06F 21/577 (2013.01); G06F 7/02 (2013.01); G06F 9/44526 (2013.01);
(Continued)

(58) Field of Classification Search
None
See application file for complete search history.

(56) References Cited

U.S. PATENT DOCUMENTS 9,596,292 B1 * 3/2017 Rankov ................... H04L 67/10
10,033,747 B1 * 7/2018 Paithane ............... G06F 21/554
(Continued)

FOREIGN PATENT DOCUMENTS

CN 104182700 A 12/2014
WO 2016041084 A1 3/2016
WO 2018006241 A1 1/2018

OTHER PUBLICATIONS

International Searching Authority, "Written Opinion and International Search Report," in connection with International application No. PCT/CN2016/088397, dated Apr. 7, 2017, 11 pages.
(Continued)

Primary Examiner — Michael Pyzocha
(74) Attorney, Agent, or Firm — Hanley, Flight & Zimmerman, LLC

(57) ABSTRACT

An improved anti-malware protection system protects computers against exploits in a scripting language that may be run in a browser. The system comprises a recorder that records scripting language execution events, a trace generator that transforms the recorded scripting language execution events into an execution trace, and a security engine that scans the execution trace and advises a security software about exploits found in the execution trace. By hooking the recorder into a runtime application programming interface for the scripting language, the improved protection system can detect exploits dynamically without the need for a browser-dependent plugin. An optional plugin can be included to perform file-based analysis of the script in addition to the runtime analysis of the script. The system can provide an application programming interface that can be used by multiple security software programs from multiple vendors to create an enhanced security software product.

25 Claims, 6 Drawing Sheets

(51) Int. Cl.
  *G06F 7/02* (2006.01)
  *G06F 9/445* (2018.01)
  *G06F 21/54* (2013.01)
  *G06F 21/12* (2013.01)
(52) U.S. Cl.
  CPC .......... *G06F 16/2379* (2019.01); *G06F 21/12* (2013.01); *G06F 21/54* (2013.01); *G06F 2221/033* (2013.01)

(56) References Cited

U.S. PATENT DOCUMENTS

| | | | | |
|---|---|---|---|---|
| 10,192,052 | B1* | 1/2019 | Singh | G06F 21/566 |
| 2007/0107057 | A1* | 5/2007 | Chander | G06F 21/54 |
| | | | | 726/22 |
| 2007/0113282 | A1* | 5/2007 | Ross | G06F 21/56 |
| | | | | 726/22 |
| 2008/0189550 | A1* | 8/2008 | Roundtree | G06F 21/51 |
| | | | | 713/176 |
| 2010/0005528 | A1* | 1/2010 | Teller | H04L 63/1416 |
| | | | | 726/22 |
| 2010/0011341 | A1* | 1/2010 | Baierl | G06F 11/3636 |
| | | | | 717/110 |
| 2010/0180344 | A1* | 7/2010 | Malyshev | G06F 21/53 |
| | | | | 726/23 |
| 2011/0289582 | A1* | 11/2011 | Kejriwal | G06F 21/566 |
| | | | | 726/22 |
| 2013/0174262 | A1 | 7/2013 | Amit et al. | |
| 2014/0137190 | A1* | 5/2014 | Carey | G06F 21/577 |
| | | | | 726/3 |
| 2015/0101052 | A1* | 4/2015 | Ledenev | G06F 21/566 |
| | | | | 726/24 |
| 2015/0163237 | A1 | 6/2015 | Pistoia et al. | |
| 2015/0256556 | A1* | 9/2015 | Kaminsky | H04L 63/1433 |
| | | | | 726/23 |
| 2015/0363598 | A1* | 12/2015 | Xu | G06F 21/566 |
| | | | | 726/23 |
| 2016/0359875 | A1* | 12/2016 | Kim | G06F 21/566 |
| 2017/0185774 | A1* | 6/2017 | Sahita | G06F 21/577 |
| 2021/0058896 | A1* | 2/2021 | Han | H04W 76/12 |

OTHER PUBLICATIONS

International Searching Authority, "International Preliminary Report on Patentability," in connection with International application No. PCT/CN2016/088397, dated Jan. 8, 2019, 4 pages.

* cited by examiner

METHOD AND APPARATUS TO DETECT SECURITY VULNERABILITIES IN A WEB APPLICATION

TECHNICAL FIELD

Embodiments described herein generally relate to client and server network traffic, and more particularly to detect security vulnerabilities dynamically in a web application by executing in a web browser.

BACKGROUND ART

Today, when a user or client machine, e.g., a computer or a mobile device, requests a web content on the Internet via a web application, e.g., a resource name through a Hypertext Transfer Protocol (HTTP) GET command to a web server, content is sent from the web server or other location on the Internet and is rendered at the web browser. Content can include both executable content and non-executable content that may be embedded in web pages that are received over the Internet. Executable content, including forms or other dynamic client-side scripts (e.g. inline scripts in JavaScript® scripting language or Asynchronous JavaScript and XML (AJAX)) while non-executable content may include hypertext markup tags in HyperText Markup Language 5 (HTML5) and Cascading Style Sheets (CSS). (JAVASCRIPT is a registered trademark of Oracle Corporation.) JavaScript instructions that are embedded in web pages may be executed by a web browser when the web page is selected. As more and more users are interconnected over the Internet, computer security becomes increasingly more important, as web pages may include malicious software (malware) that is inserted en route to a user or at the source of the web page. In some cases, a user may forego security measures for certain websites and implicitly trust that the content being delivered will not harm the user's machine. However, third parties can circumvent web server security and insert bad content or manipulate active content in web pages during transit from trusted web domains to the user. For example content that has the potential to steal information from the user machine may be inserted through cross-site scripting via a gateway or man-in-the middle (MITM) injection by using malicious internet bots that masquerade as a user (by trying to login) or that masquerade as user input (by changing user input clicks and input fields). The malicious internet bots may detect user input fields by using element identifiers or element classes in the HTML web page. In another example, malicious JavaScript may be embedded at the source of the web page, such as by the publisher or via included advertisements, or injected redirects or IFRAMEs.

The Open Web Platform (OWP) is a collection of Web technologies developed by the World Wide Web Consortium and other Web standardization bodies such as the Unicode Consortium, the Internet Engineering Task Force, and Ecma International. HTML5 as the language used to build Web pages and applications has become widely adopted on a wide variety of devices, significantly lowering the costs of creating rich applications on the Open Web Platform. Unfortunately, the complexity of the browsers to support this new and rapidly expanding functionality has led to many vulnerabilities and associated safety issues hinder wider adoption of new Web technologies. An ability to detect exploitation of these vulnerabilities is critical.

There are many security products detecting malicious exploits against Web browsers. A common approach is to track the configuration of and monitor the code execution of the browser. For example, the security product may monitor any potential change of the "home page" inside the browser, block an end user from installing or loading any malicious browser plugin, or implement the JavaScript engine as an isolated process. Those measures are insufficient for HTML5 monitoring as they lack dynamic and behavioral analysis of the Open Web Platform operation.

There are several security tools that try to analyze JavaScript statically, for example, the Security AppScan product provided by IBM Corp. The IBM product can detect known exploits written in JavaScript, but this approach does not work well for HTML5 due to its highly dynamic capabilities—for example, the execution logic may depend upon user actions, content may be loaded from remote servers, and content may be encrypted, making even static inspection difficult. In addition, the HTML5 specification exposes many programmable interfaces and application programming interfaces (APIs) to a Web application developer. Without knowing the runtime semantic and tracking dynamic state of HTML5 objects, for example, canvas objects, reliably detecting exploits is not possible. A way to provide Web application runtime security monitoring would be desirable.

Prior art solutions for defending against script injection in HTML web pages have addressed rejecting bad data characters, limiting information in server responses, enforcing response lengths, limiting permissions in web browsers, or detecting bad scripts and blocking their execution, or blocking execution of all scripts in a web browser. However, these solutions are not completely effective. For example, rejecting bad data requires that a web browser know all variations of malicious inputs in the data. However, an attacker may only need to find one vulnerability in a website or browser code in order to exploit this vulnerability. Additionally, limiting information in server responses such as blocking script execution or limiting permissions in web browsers may degrade a user's online experience. A way of providing web browser security for preventing exploitable or malware-injected content in HTML web pages from executing at a web browser on a user client would be desirable.

DESCRIPTION OF EMBODIMENTS

Figure 1:
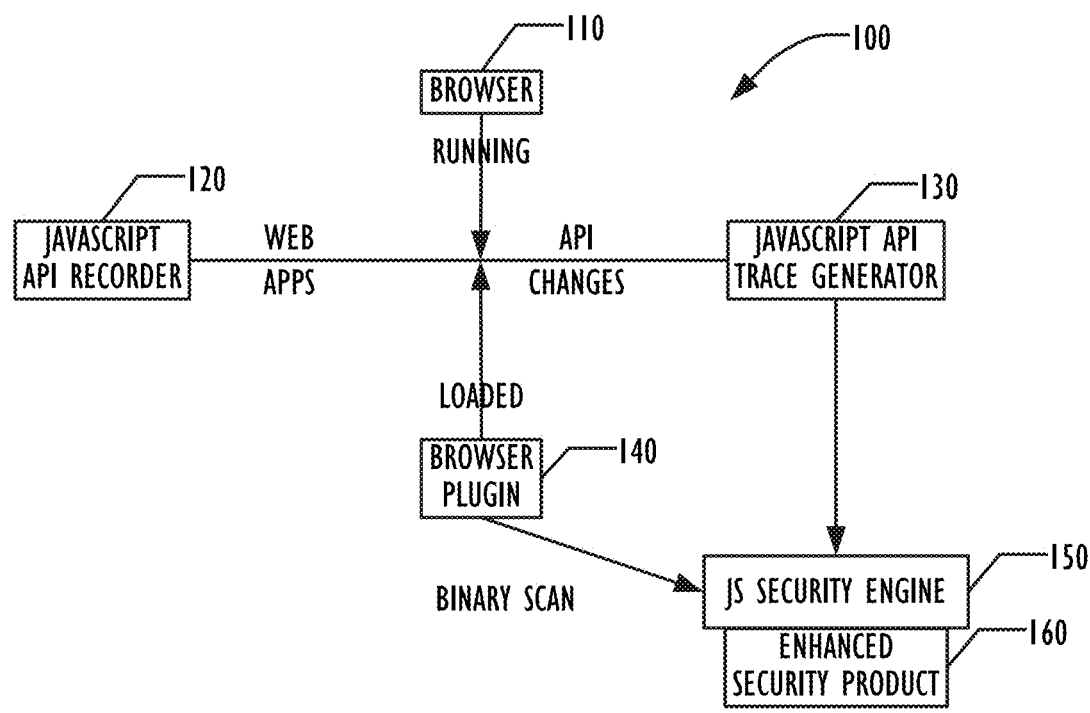
FIG. 1 is a block diagram that illustrates an architecture for capturing a JavaScript execution trace and providing the trace to a JavaScript security engine for use by an enhanced security product according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "programmable device" can refer to a single programmable device or a plurality of programmable devices working together to perform the function described as being performed on or by a programmable device. The programmable device may be implemented as a physical device or may be virtualized as a virtual programmable device hosted on a physical device.

As used herein, the term "processing element" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processing element to perform an action may program any or all of the processing elements to perform the indicated action. Where the processing element is one or more multi-core processors, instructions that when executed program the processing element to perform an action may program any or all of the multiple cores to perform the indicated action.

As used herein, the term "malware" can refer to any software used to disrupt operation of a programmable device, gather sensitive information, or gain access to private systems or networks. Malware includes computer viruses (including worms, Trojan horses, etc.), Bots, ransomware, spyware, adware, scareware, and any other type of malicious program.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

A "browser," sometimes referred to as a "web browser," is a software application for retrieving, presenting, and traversing information resources on the World Wide Web. An information resource is identified by a Uniform Resource Identifier (URI) or Uniform Resource Locator (URL) and may be a web page, image, video, or other piece of content. Hyperlinks present in resources enable users easily to navigate their browsers to related resources. Although browsers are primarily intended to use the World Wide Web, they can also be used to access information provided by web servers in private networks or files in file systems.

The term "hooking" covers a range of techniques used to alter or augment the behavior of an operating system, of applications, or of other software components by intercepting function calls, messages, or events passed between software components. Code that handles such intercepted function calls, events, or messages is called a "hook."

As used herein, a "security product" refers to product, typically implemented in software that monitors a programmable device to detect and protect against unwanted activity caused by malware and other forms of unwanted data or code. Traditional security products have been unable to detect and protect against JavaScript code running in a browser. An "enhanced security product" refers to a security product that provides an interface to a JavaScript security engine as described below, allowing the enhanced security product to monitor execution of JavaScript code and provide enhanced protection against malware and other unwanted objects executed by the browser dynamically, without depending upon static analysis of the JavaScript code.

An improved anti-malware protection system protects computers against exploits in a scripting language that may be run in a browser. The system comprises a recorder that records scripting language execution events, a trace generator that transforms the recorded scripting language execution events into an execution trace, and a security engine that scans the execution trace and advises a security software about exploits found in the execution trace. By hooking the recorder into a runtime application programming interface for the scripting language, the improved protection system can detect exploits dynamically without the need for a browser-dependent plugin. An optional plugin can be included to perform file-based analysis of the script in addition to the runtime analysis of the script. The system can provide an application programming interface that can be used by multiple security software programs from multiple vendors to create an enhanced security software product.

Although described herein in terms of JavaScript, the invention is not so limited, and the techniques described here can be used with any scripting language that can be embedded in HTML and executed by the browser, such as EcmaScript.

Techniques described below capture a JavaScript programmable API execution trace directly from JavaScript. The execution trace can then be scanned by an enhanced traditional security product based on the knowledge of the JavaScript security vulnerabilities.

As described below, techniques provide an improved way of detecting exploits in JavaScript at runtime, allowing capture JavaScript execution, producing a log of JavaScript execution, including API calls and their related context. The log is generally referred to herein as an execution trace. The execution trace may then be provided to and scanned by an enhanced security product based on knowledge of JavaScript security vulnerabilities. The basic principles are:

1. During Web application execution inside the browser, a hook can be added inside the JavaScript layer, which can produce information that can be used for monitoring purpose. Such information may include, but is not limited to: (a) notification of a plugin load event by a browser (and any related URL) and (b) a JavaScript execution trace.

2. Traditional file-based binary scan capability can be used in combination with the hook inside the JavaScript layer to detect security issues inside browser plug-ins at Web application runtime.

3. A traditional security product can be enhanced when provided the JavaScript execution trace and knowledge of JavaScript security vulnerabilities.

Unlike conventional static analysis, the techniques described herein can dynamically generate JavaScript execution traces based on HTML and JavaScript at runtime. The techniques are not dependent upon the nature of the browser, and any browser can be hooked that is compliant with the public specifications for browsers and HTML as defined by international standards organizations such as the World Wide Web Consortium (W3C). The techniques do not reply on browser plugins, which are specific to each browser implementation, but can make use of plugins to provide additional information as desired.

In addition, unlike static tools that analyze JavaScript source code, the techniques described below can detect security issues at runtime, no matter whether the source code is encrypted, or whether the source code is loaded dynamically or triggered by user actions. The techniques described here do not supersede traditional security products, but provide a JavaScript security engine that can be embedded or coupled with a security product that can use any desired technique to analyze the JavaScript execution trace using any analysis capability available to the security product. The techniques also improve the capability of traditional security products to monitor browser plugin modules, which may be unwanted or malicious.

FIG. 1 is a block diagram that illustrates an architecture for a system 100 for capturing a JavaScript execution trace and providing the trace to a JavaScript security engine for use by an enhanced security product according to one embodiment. The techniques provide a solution that detects exploits against web applications using the enhanced security product to scan and detect security issues at application runtime based on the JavaScript execution trace provided to the JavaScript security engine that is associated with the enhanced security product.

A browser 110 provides a JavaScript layer or engine that can execute JavaScript code that is inline in the HTML of a web page or obtained via a URL contained in the HTML. As the JavaScript code executes in the JavaScript engine of the browser 110, a JavaScript API recorder 120 records all JavaScript API events and changes, including invocations of all programmable objects and their related context. The context of the API events may include object properties and attributes at the time of the call, parameter values, values of global variables, values of local variables, or information on the function call stack or execution stack. In some embodiments, the JavaScript API recorder 120 engages with the JavaScript engine of the browser 110 by hooking into the JavaScript engine. Any desired hooking technique may be used, including injection of a JavaScript module into the HTML page before the JavaScript script is executed. After sufficient information is collected by the JavaScript API recorder 120, the collected information may be sent to a JavaScript API trace generator 130. In one embodiment, the collected information is buffered by the JavaScript API recorder 120 and dumped into a file that is sent to the JavaScript API trace generator 130. Other techniques for transmitting the collected information may be used as desired. Any desired data structure or format may be used for transmitting the collected information to the JavaScript API trace generator 130.

The JavaScript API trace generator 130 may then parse the collected information received from the JavaScript API recorder 120 and translate or compile the collected information into a predetermined JavaScript execution trace format. In one embodiment, the JavaScript execution trace format comprises a simple text file, but any desired data structure format may be used for the JavaScript execution trace format output by the JavaScript API trace generator 130.

The JavaScript execution trace information is received from the JavaScript API trace generator by a JavaScript security engine 150. Although illustrated in FIGS. 1-2 as separate from the enhanced security product 160, the JavaScript security engine 150 in one embodiment is configured for embedding into an enhanced security product 160 external to the browser. In other embodiments, the JavaScript security engine 150 may be an object, either contained in the browser or external to the browser, that is invoked by and communicates with the enhanced security product 160. In one embodiment, the JavaScript security engine 150 scans the JavaScript execution trace received from the JavaScript API trace generator 130 to detect security issues based on the knowledge of JavaScript security vulnerabilities, and informs the enhanced security product 160 of any detected exploits, allowing the enhanced security product 160 to take any desired action in response to detecting an exploit. In some embodiments, the JavaScript security engine may provide the JavaScript execution trace, unchanged or reformatted to a format desired by the enhanced security product 160, and allow the enhanced security product 160 to perform analysis of the JavaScript execution trace, in addition to or instead of analysis by the JavaScript security engine 150. In some embodiments, the JavaScript security engine 150 defines an API for the enhanced security product to obtain the output of the JavaScript security engine 150, which may include the JavaScript execution trace, allowing the enhanced security product 16—to perform its own analysis of the execution trace as desired. The enhanced security product 160 may then take any actions that the enhanced security product 160 deems advisable, such as forcing termination of the JavaScript script, generating indications that may be displayed to the user, or generating requests for user decisions.

The JavaScript security engine 150 may be provided to the vendor or manufacturer of the enhanced security product 160 for embedding in the enhanced security product 160. Alternately, the JavaScript security engine 150 may be linked to the enhanced security product 160 using any desired linking technique known in the art. Security knowledge may be obtained by the JavaScript security engine in any desired manner, such as downloading or updating a database of known security vulnerabilities from a security database server. Thus, the JavaScript security engine 150 may be kept up to date about security vulnerabilities to scan for in the JavaScript execution trace generated by the JavaScript API trace generator 130.

In some embodiments, the enhanced security product 160 may be provided by the same entity that provides the JavaScript API recorder 120, JavaScript API trace generator 130, and JavaScript security engine 150. In other embodiments, the enhanced security product 160 may be provided by a different vendor than the other elements, and the JavaScript API recorder 120, JavaScript API trace generator 130, and JavaScript security engine 150 may be configured for use with multiple enhanced security products 160 from one or a plurality of vendors.

In some embodiments, a browser plugin 140 may be installed with the browser 110 that once loaded may perform its own actions, such as scanning a binary and providing a result of that scan to either the JavaScript security engine 150, as illustrated in FIG. 1, or the enhanced security product 160.

By providing a browser independent execution trace of JavaScript execution, the system 100 enhances the security monitoring capability of the enhanced security product 160 with enhanced runtime web application monitoring, allowing better detection of security vulnerabilities and use of accumulated security knowledge. The JavaScript API recorder 120 can generate information for the JavaScript API trace generator 130 that is based on any type of HTML code, including HTML5. Even if the JavaScript is delivered to the browser in an encrypted object, because the JavaScript API recorder 120 hooks into the JavaScript execution layer in the browser 110, the execution of the JavaScript script can be traced. While the JavaScript API recorder 120 captures and records JavaScript API changes and parameters, the plugin 140 may optionally scan JavaScript level execution using binary scan techniques, providing additional tracing and scanning capabilities.

Figure 2:
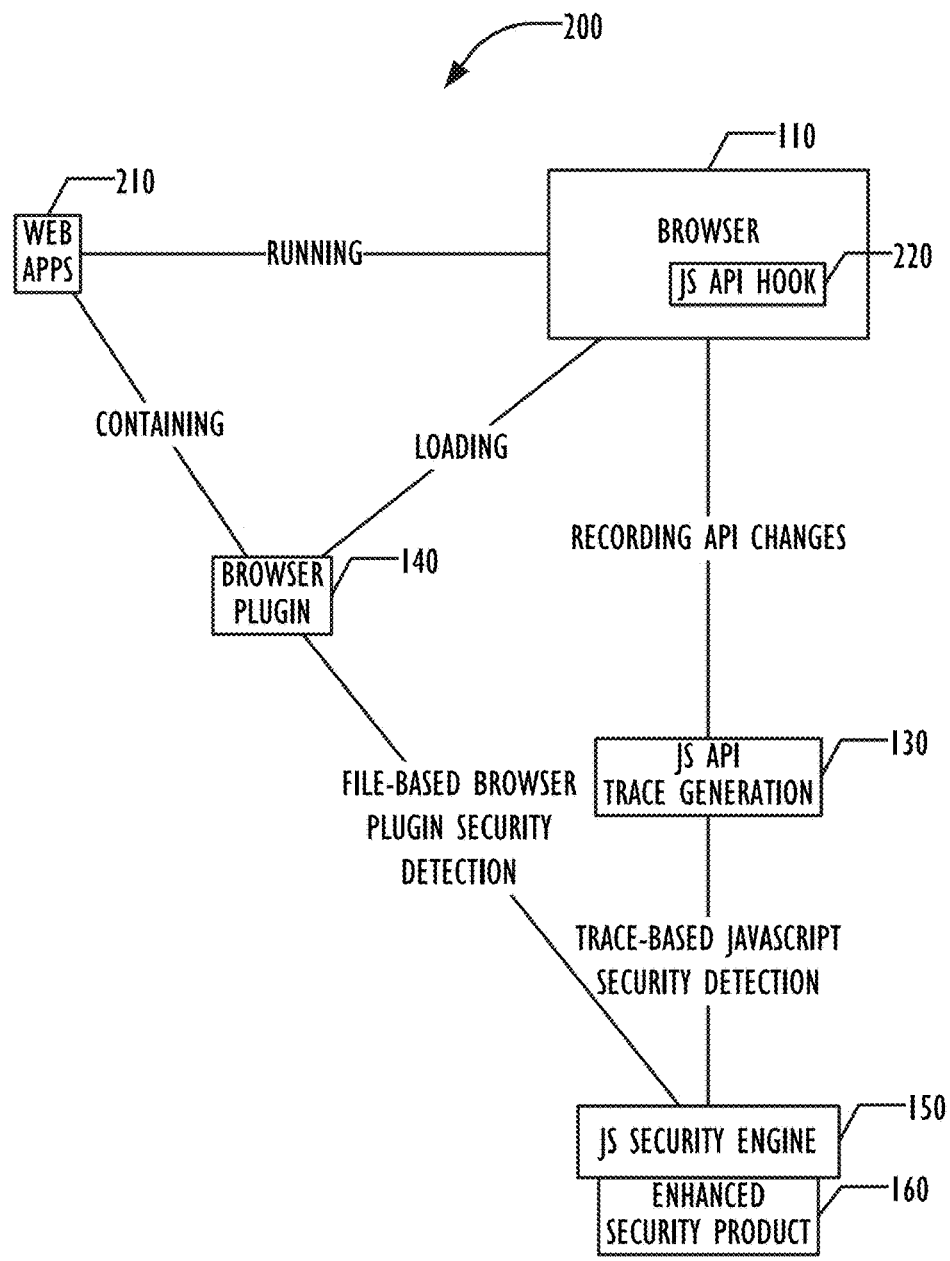
FIG. 2 is a dataflow diagram illustrating operation of the system of FIG. 1 according to one embodiment.

FIG. 2 is a dataflow diagram 200 illustrating operation of the system 100 according to one embodiment.

With a web application 210 running on the browser 110, one or more JavaScript API hooks allows the hooked JavaScript API recorder 120 to record JavaScript API status changes. As indicated above, any desired hooking technique may be used by the JavaScript API hook 220, including JavaScript injection techniques in which JavaScript code to invoke or execute the JavaScript API recorder 120 is inserted into the web application 210's JavaScript code to be executed by the browser 110. The JavaScript API recorder 120 may dump the standard JavaScript API changes including exposed programmable object invocations with related parameters. In some embodiments, the JavaScript API recorder 120 may send the API changes and parameters to the JavaScript API trace generator 130 every time an API invoked by the JavaScript program running in the browser 110.

The output of the JavaScript API recorder 120 is sent to the JavaScript API trace generator 130. As indicated above, the output may be delivered to the JavaScript API trace generator 130 in any desired or convenient way. The JavaScript API trace generator 130 then generates the JavaScript execution trace and outputs the trace to the JavaScript security engine 150. The JavaScript security engine 150 may then deliver the execution trace to the enhanced security product 160 to allow the enhanced security product 160 to scan and analyze the JavaScript execution trace or the JavaScript security engine 150 may perform the scan of the JavaScript execution trace and provide indications of issues found to the enhanced security product 160.

In some embodiments, the JavaScript API trace generator may receive output regarding JavaScript API changes and parameters as they occur, and continuously build an increasingly long execution trace as the JavaScript program executes. In other embodiments, the JavaScript API trace generator may generate incremental execution traces, sending trace information about each chunk of JavaScript execution to the JavaScript security engine 150 as execution proceeds, allowing the JavaScript security engine 150 to build up a record of execution of the JavaScript code dynamically over time.

The JavaScript security engine 150 may be implemented as an extension of security products with an API allowing the enhanced security product 160 to communicate with the JavaScript security engine 150 as execution proceeds. In some embodiments, the JavaScript security engine 150 is an extension of other trace-based exploit detection technology for security vulnerabilities. As JavaScript execution trace information is fed into the JavaScript security engine 150, the JavaScript security engine 150 may scan the JavaScript execution trace information using whatever scanning techniques may be desired, including signature-based and non-signature-based scanning techniques. The JavaScript security engine 150 may communicate with servers, including reputation servers and other servers that maintain information about known exploits, to create, update, and maintain a local database of exploit-detection information. Alternately, the JavaScript security engine 150 may forward some or all of the JavaScript execution trace information to a centralized server (not shown in FIG. 2) that may scan the JavaScript execution trace and provide scan results back to the JavaScript security engine 150 that can be provided to the enhanced security product 160. Techniques for sending material to be scanned for malware to a centralized server are well known in the art and need not be further described herein.

In addition, in embodiments where a browser plugin 140 is used, the browser plugin may perform file-based browser security analysis to examine files containing the JavaScript code to be executed by the web application 210. The results of the browser plugin detection procedure may be provided to the JavaScript security engine 150 as illustrated in FIG. 2, or in some embodiments may be provided directly to the enhanced security product 160, allowing the enhanced security product to scan and analyze the information produced by the plugin 140.

In addition, in some embodiments the enhanced security product 160 may be notified when the browser plugin 140 is loaded into the web browser 110 for facilitation of some function by the browser 110. In such embodiments, the enhanced security product 160 may perform a scan of the plugin 140 to determine whether the plugin is malicious, providing an indication to the browser 110 of the determination and allowing the browser 110 to refuse to complete the loading of the plugin.

Figure 3:
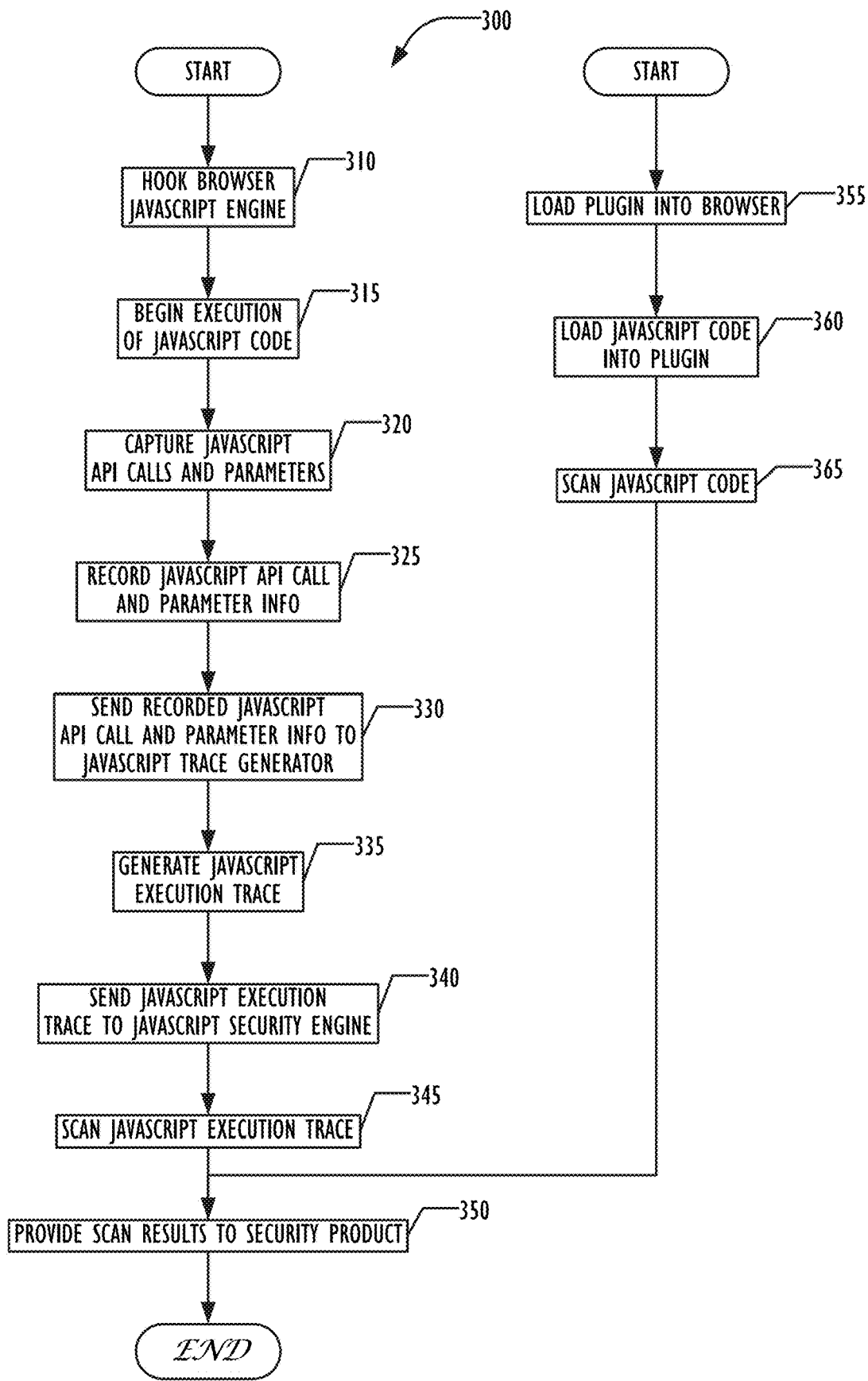
FIG. 3 is a flowchart that illustrates a technique for detecting security vulnerabilities in a web application according to one embodiment.

Turning now to FIG. 3, a flowchart 300 illustrates a technique for detecting security vulnerabilities in a web application 210 according to one embodiment. In block 310, the JavaScript engine of the browser 110 is hooked, to allow the JavaScript API recorder 120 to begin recording use of the JavaScript API. As indicated above, hooking the JavaScript API recorder 120 can be performed using any desired hooking technique. Such techniques are known in the art and need not be described in more detail here. In one embodiment, at this time the JavaScript API trace generator 130 may be loaded into memory and initialized.

In block 315, JavaScript code begins execution in the web application 210. As the =JavaScript code executes, JavaScript commands invoke JavaScript API calls and the JavaScript API recorder 120 captures those invocations, including the parameters to those invocations in block 320 and records the captured invocations and parameters in block 325. In block 330, the JavaScript API recorder 120 sends the recorded JavaScript API invocations to the JavaScript API trace generator 130 using interprocess communications techniques or any other desired technique for passing data between executing modules. In block 335, the JavaScript API trace generator 130 generates a JavaScript execution trace. In block 340, the JavaScript API trace generator 130 sends the JavaScript execution trace to the JavaScript security engine 150. The JavaScript security engine 150 may then in block 345 scan the JavaScript execution trace and provide the scan results to the enhanced security product in block 350.

Although illustrated in sequence in flowchart 300, some or all of blocks 320-330 and 335-350 may execute in parallel in some embodiments, allowing the JavaScript API recorder 120 to be recording JavaScript execution while the JavaScript API trace generator 130 is generating the JavaScript execution trace and sending the trace to the JavaScript security engine 150, and the JavaScript security engine 150 to operate in asynchronously with any or all of the JavaScript API recorder 120, JavaScript API trace generator 130, the JavaScript security engine 150. In addition, blocks 320-330 are repeated as needed throughout the execution of the JavaScript code executing in the browser 110, while blocks 340-350 may be repeated as needed to process the JavaScript execution trace elements produced by the JavaScript API trace generator 130.

In some embodiments, where plugin 140 is employed, the plugin may be loaded into the browser 110 at block 355, either as part of initialization of the browser 110 or upon an invocation of a JavaScript object. In block 360, the plugin 140 may intercept execution of a JavaScript object and load the JavaScript code into the plugin 140, where the JavaScript code may be scanned for vulnerabilities or exploits in block 365. The results of the scan may then be sent to the enhanced security product 160 in block 350. Alternately, the scan results may be sent to the JavaScript security engine 150 for processing before being provided to the enhanced security product 160.

The enhanced security product 160 may perform any other desired security functions for the detection of malware, including analysis of plugins that are loaded into the browser 110. These functions need not be further described herein, as they are outside the scope of this invention. The enhanced security product 160 may also take any desired action in response to the information obtained from the JavaScript security engine 150 or the plugin 140, including disabling the web application 210 or the JavaScript code that is being executed, or even disabling of the JavaScript engine in the browser 110. In addition, the enhanced security product 160 may generate or display warnings or other notifications to a user of the programmable device on which these functions are executed, and may also provide information about the exploits detected and any actions taken in response to detecting those exploits to servers for further analysis of the exploits and updating of information about known JavaScript exploits.

Figure 4:
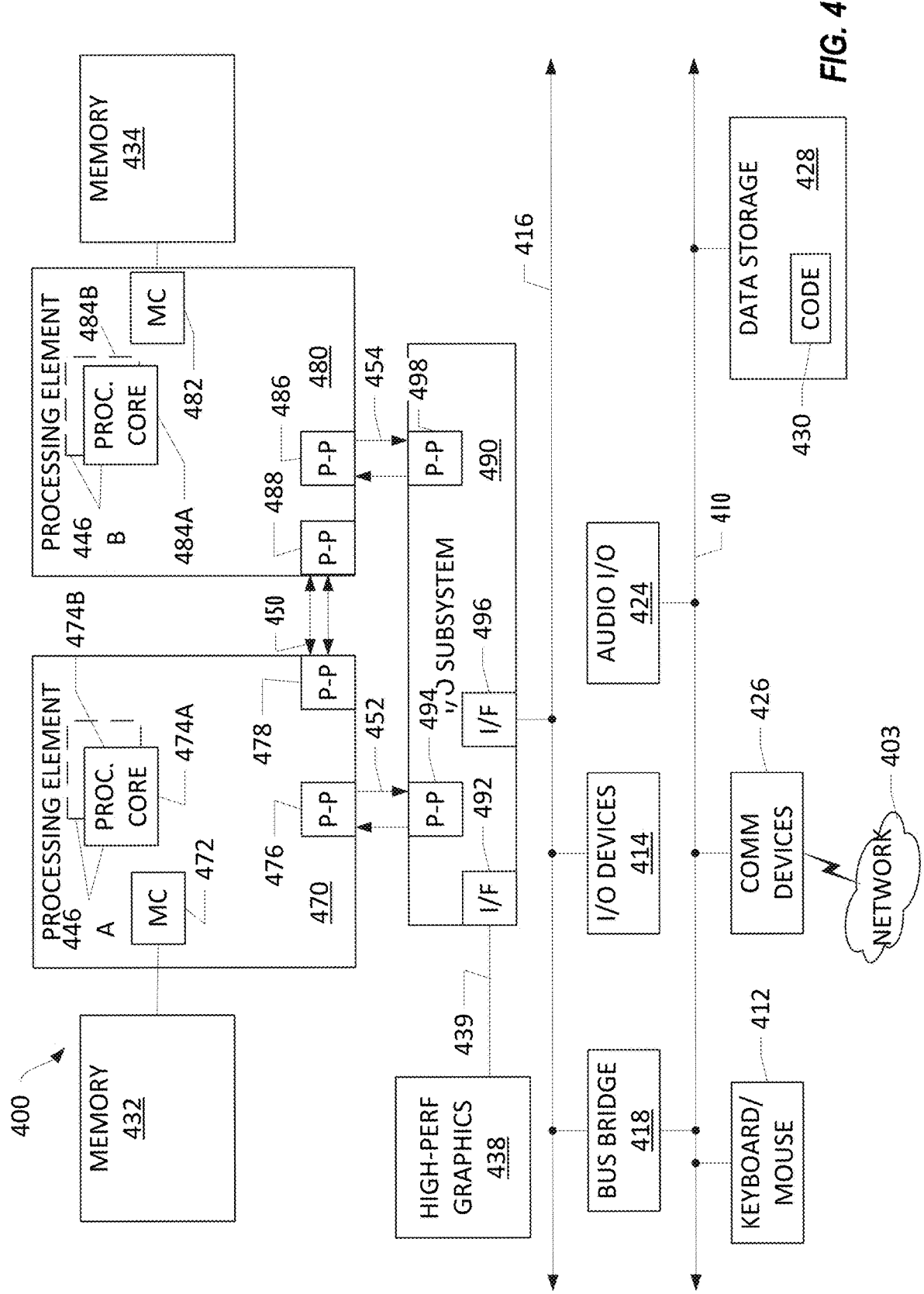
FIGS. 4-5 are block diagrams illustrating programmable devices for use with techniques described herein according to two environments.

Referring now to FIG. 4, a block diagram illustrates a programmable device 400 that may be used for implementing the techniques described herein in accordance with one embodiment. The programmable device 400 illustrated in FIG. 4 is a multiprocessor programmable device that includes a first processing element 470 and a second processing element 480. While two processing elements 470 and 480 are shown, an embodiment of programmable device 400 may also include only one such processing element.

Programmable device 400 is illustrated as a point-to-point interconnect system, in which the first processing element 470 and second processing element 480 are coupled via a point-to-point interconnect 450. Any or all of the interconnects illustrated in FIG. 4 may be implemented as a multi-drop bus rather than point-to-point interconnects.

As illustrated in FIG. 4, each of processing elements 470 and 480 may be multicore processors, including first and second processor cores (i.e., processor cores 474a and 474b and processor cores 484a and 484b). Such cores 474a, 474b, 484a, 484b may be configured to execute instruction code. However, other embodiments may use processing elements that are single core processors as desired. In embodiments with multiple processing elements 470, 480, each processing element may be implemented with different numbers of cores as desired.

Each processing element 470, 480 may include at least one shared cache 446. The shared cache 446a, 446b may store data (e.g., instructions) that are utilized by one or more components of the processing element, such as the cores 474a, 474b and 484a, 484b, respectively. For example, the shared cache may locally cache data stored in a memory 432, 434 for faster access by components of the processing elements 470, 480. In one or more embodiments, the shared cache 446a, 446b may include one or more mid-level caches, such as level 2 (L2), level 3 (L3), level 4 (L4), or other levels of cache, a last level cache (LLC), or combinations thereof.

While FIG. 4 illustrates a programmable device with two processing elements 470, 480 for clarity of the drawing, the scope of the present invention is not so limited and any number of processing elements may be present. Alternatively, one or more of processing elements 470, 480 may be an element other than a processor, such as an graphics processing unit (GPU), a digital signal processing (DSP) unit, a field programmable gate array, or any other programmable processing element. Processing element 480 may be heterogeneous or asymmetric to processing element 470. There may be a variety of differences between processing elements 470, 480 in terms of a spectrum of metrics of merit including architectural, microarchitectural, thermal, power consumption characteristics, and the like. These differences may effectively manifest themselves as asymmetry and heterogeneity amongst processing elements 470, 480. In some embodiments, the various processing elements 470, 480 may reside in the same die package.

First processing element 470 may further include memory controller logic (MC) 472 and point-to-point (P-P) interconnects 476 and 478. Similarly, second processing element 480 may include a MC 482 and P-P interconnects 486 and 488. As illustrated in FIG. 4, MCs 472 and 482 couple processing elements 470, 480 to respective memories, namely a memory 432 and a memory 434, which may be portions of main memory locally attached to the respective processors. While MC logic 472 and 482 is illustrated as integrated into processing elements 470, 480, in some embodiments the memory controller logic may be discrete logic outside processing elements 470, 480 rather than integrated therein.

Processing element 470 and processing element 480 may be coupled to an I/O subsystem 490 via respective P-P interconnects 476 and 486 through links 452 and 454. As illustrated in FIG. 4, I/O subsystem 490 includes P-P interconnects 494 and 498. Furthermore, I/O subsystem 490 includes an interface 492 to couple I/O subsystem 490 with a high performance graphics engine 438. In one embodiment, a bus (not shown) may be used to couple graphics engine 438 to I/O subsystem 490. Alternately, a point-to-point interconnect 439 may couple these components.

In turn, I/O subsystem 490 may be coupled to a first link 416 via an interface 496. In one embodiment, first link 416 may be a Peripheral Component Interconnect (PCI) bus, or a bus such as a PCI Express bus or another I/O interconnect bus, although the scope of the present invention is not so limited.

As illustrated in FIG. 4, various I/O devices 414, 424 may be coupled to first link 416, along with a bridge 418 that may couple first link 416 to a second link 420. In one embodiment, second link 420 may be a low pin count (LPC) bus. Various devices may be coupled to second link 420 including, for example, a keyboard/mouse 412, communication device(s) 426 (which may in turn be in communication with the computer network 403), and a data storage unit 428 such as a disk drive or other mass storage device which may include code 430, in one embodiment. The code 430 may include instructions for performing embodiments of one or more of the techniques described above. Further, an audio I/O 424 may be coupled to second link 420.

Note that other embodiments are contemplated. For example, instead of the point-to-point architecture of FIG. 4, a system may implement a multi-drop bus or another such communication topology. Although links 416 and 420 are illustrated as busses in FIG. 4, any desired type of link may be used. In addition, the elements of FIG. 4 may alternatively be partitioned using more or fewer integrated chips than illustrated in FIG. 4.

Figure 5:
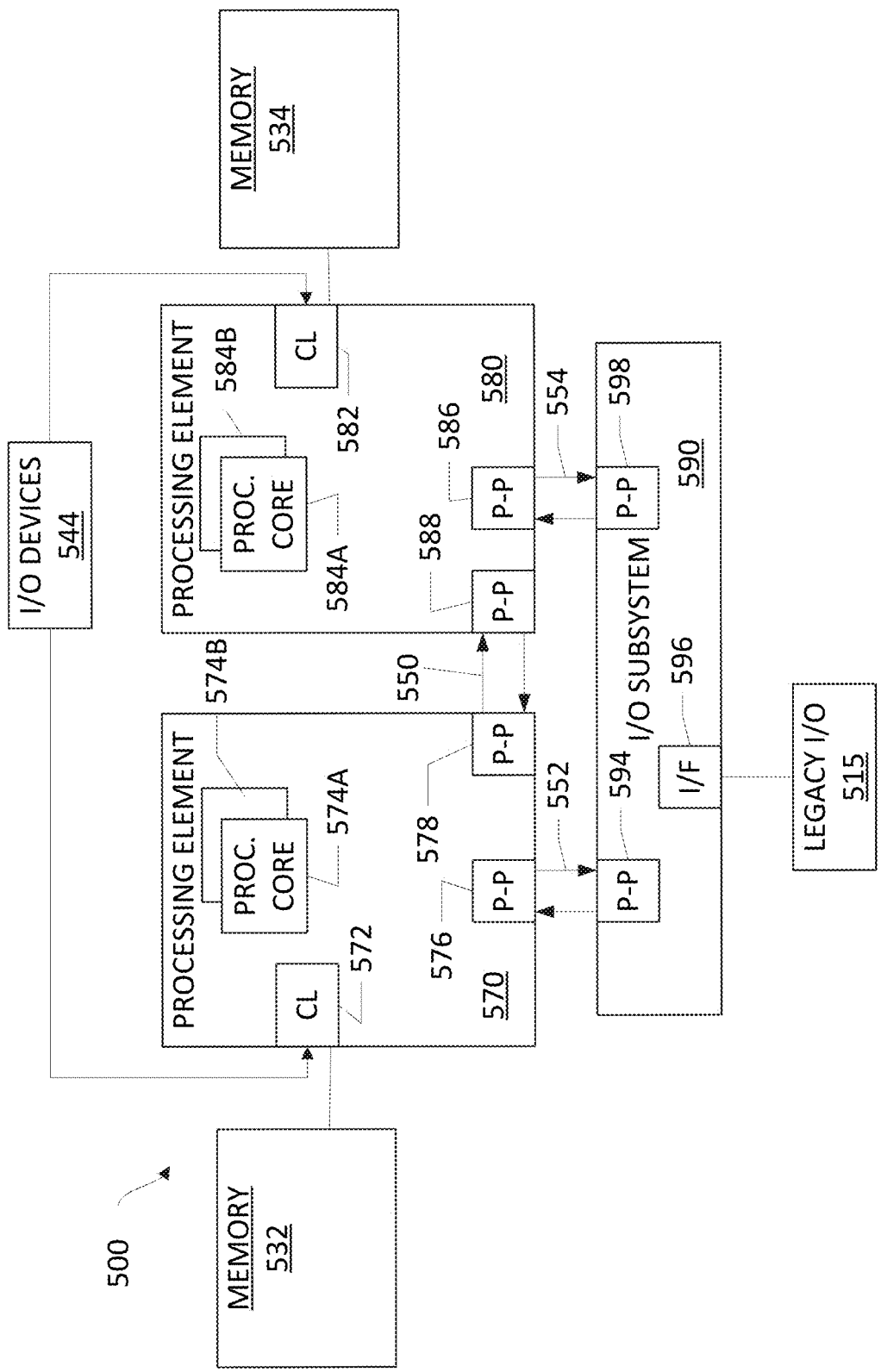

Referring now to FIG. 5, a block diagram illustrates a programmable device 500 according to another embodiment. Certain aspects of FIG. 5 have been omitted from FIG. 5 in order to avoid obscuring other aspects of FIG. 5.

FIG. 5 illustrates that processing elements 570, 580 may include integrated memory and I/O control logic ("CL") 572 and 582, respectively. In some embodiments, the 572, 582 may include memory control logic (MC) such as that described above in connection with FIG. 4. In addition, CL 572, 582 may also include I/O control logic. FIG. 5 illustrates that not only may the memories 532, 534 be coupled to the CL 572, 582, but also that I/O devices 544 may also be coupled to the control logic 572, 582. Legacy I/O devices 515 may be coupled to the I/O subsystem 590 by interface 596. Each processing element 570, 580 may include multiple processor cores, illustrated in FIG. 5 as processor cores 574A, 574B, 584A and 584B. As illustrated in FIG. 5, I/O subsystem 590 includes point-to-point (P-P) interconnects 594 and 598 that connect to P-P interconnects 576 and 586 of the processing elements 570 and 580 with links 552 and 554. Processing elements 570 and 580 may also be interconnected by link 550 and interconnects 578 and 588, respectively.

The programmable devices depicted in FIGS. 4 and 5 are schematic illustrations of embodiments of programmable devices that may be utilized to implement various embodiments discussed herein. Various components of the programmable devices depicted in FIGS. 4 and 5 may be combined in a system-on-a-chip (SoC) architecture.

Figure 6:
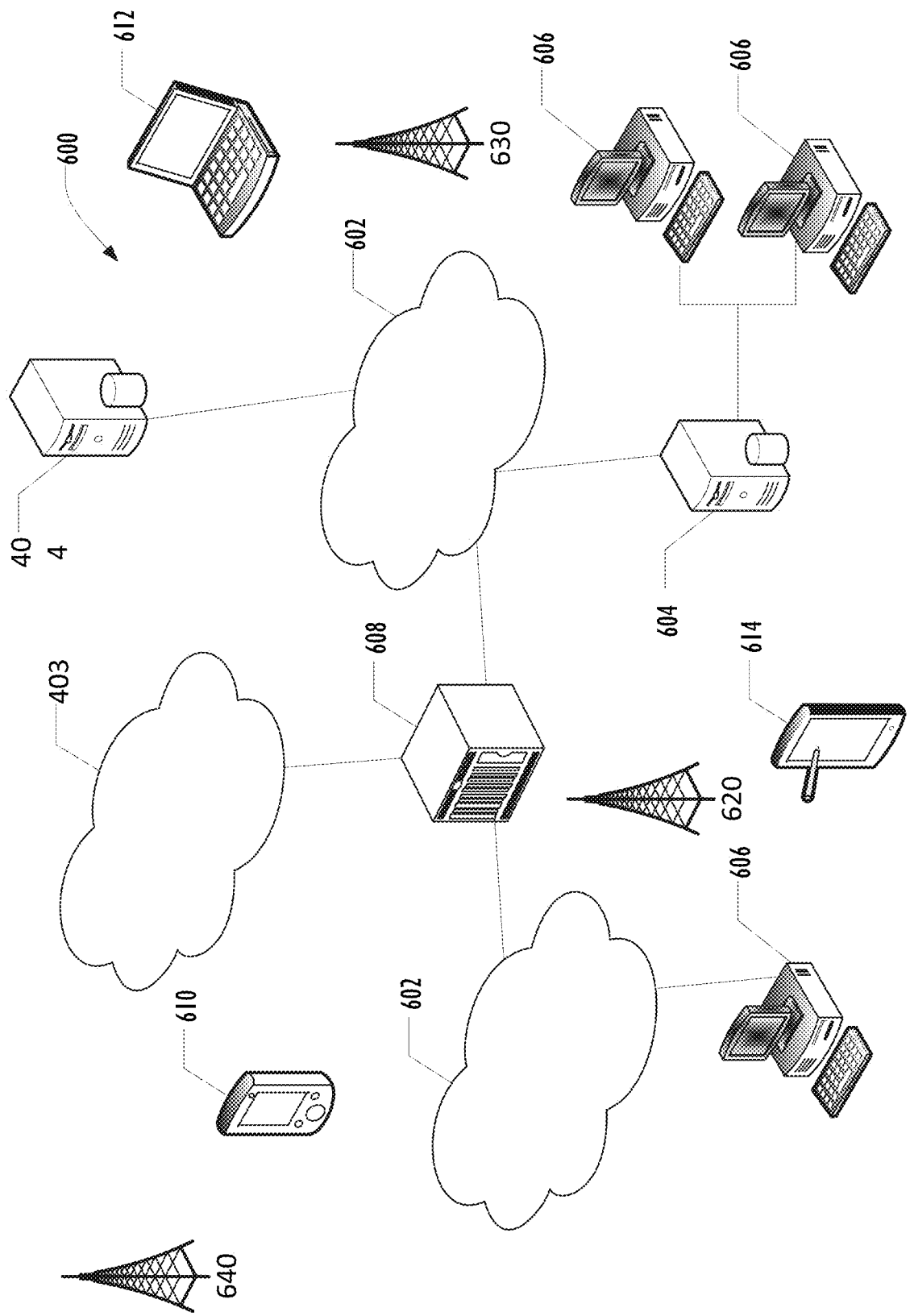
FIG. 6 is a diagram illustrating a network of programmable devices according to one embodiment.

Referring now to FIG. 6, an example infrastructure 600 in which the techniques described above may be implemented is illustrated schematically. Infrastructure 600 contains computer networks 602. Computer networks 602 may include many different types of computer networks available today, such as the Internet, a corporate network or a Local Area Network (LAN). Each of these networks can contain wired or wireless programmable devices and operate using any number of network protocols (e.g., TCP/IP). Networks 602 may be connected to gateways and routers (represented by 608), end user computers 606, and computer servers 604. Infrastructure 600 also includes cellular network 603 for use with mobile communication devices. Mobile cellular networks support mobile phones and many other types of mobile devices. Mobile devices in the infrastructure 600 are illustrated as mobile phones 610, laptops 612, and tablets 614. A mobile device such as mobile phone 610 may interact with one or more mobile provider networks as the mobile device moves, typically interacting with a plurality of mobile network towers 620, 630, and 640 for connecting to the cellular network 603. Although referred to as a cellular network in FIG. 6, a mobile device may interact with towers of more than one provider network, as well as with multiple non-cellular devices such as wireless access points and routers 608. In addition, the mobile devices 610, 612 and 614 may interact with non-mobile devices such as computers 604 and 606 for desired services.

The techniques described above may be implemented in any of the devices illustrated in FIG. 6 that contain web browsers 110 and may execute web applications that include JavaScript code.

By providing a way to analyze JavaScript code execution at runtime, instead of static or even dynamic analysis of code prior to execution, the techniques described above provide a more effective way of detecting JavaScript exploits, avoiding attempts to hide the exploits by code encryption or other techniques. In addition, because the analysis occurs at runtime, the analysis can be performed dynamically as JavaScript code is loaded and begins execution, and is not restricted to only those JavaScript objects that can be detected as the web page or web application is loaded into the browser for rendering the web page. Thus, a more complete form of protection against vulnerabilities may be provided using these techniques.

Embodiments may be implemented in one or a combination of hardware, firmware, and software. Embodiments may also be implemented as instructions stored on a computer-readable storage medium, which may be read and executed by at least one processing element to perform the operations described herein. A computer-readable storage medium may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a standalone client or server computer system) or one or more hardware processing elements may be configured by firmware or software (e.g., instructions, an application portion, or an application) as a module that operates to perform specified operations. The software may reside on a computer readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

The following examples pertain to further embodiments.

Example 1 is a computer readable medium on which is stored software for an improved anti-malware protection system, comprising instructions that when executed program a programmable device to: hook a runtime layer used by a scripting language executable by a browser; record at runtime scripting language execution events caused by execution of a script in the scripting language; transform the recorded scripting language execution events into an execution trace; and analyze the execution trace dynamically for vulnerabilities associated with execution of the script.

In Example 2 the subject matter of Example 1 optionally includes wherein the instructions further comprise instructions that when executed program the programmable device to: inform a security software of the vulnerabilities.

In Example 3 the subject matter of any of Examples 1-2 optionally includes wherein the instructions that when executed program the programmable device to hook a runtime layer comprise instructions that when executed program the programmable device to: inject code in the scripting language into scripts executed by the runtime layer.

In Example 4 the subject matter of any of Examples 1-2 optionally includes wherein the instructions further comprise instructions that when executed program the programmable device to: provide an application programming interface for a security software; and provide information about the vulnerabilities to the security software via the application programming interface.

In Example 5 the subject matter of any of Examples 1-2 optionally includes wherein the instructions further comprise instructions that when executed program the programmable device to: employ a browser plugin interface to perform file-based analysis of vulnerabilities in the script.

In Example 6 the subject matter of any of Examples 1-2 optionally includes wherein the instructions that when executed program the programmable device to analyze the execution trace are configured for embedding in a security software external to the browser.

In Example 7 the subject matter of any of Examples 1-2 optionally includes wherein the instructions that when executed program the programmable device to analyze the execution trace comprise instructions that when executed program the programmable device to: compare information in the execution trace to a database of known scripting language vulnerabilities.

In Example 8 the subject matter of Example 7 optionally includes wherein the instructions that when executed program the programmable device to analyze the execution trace further comprise instructions that when executed program the programmable device to: update the database of known scripting language vulnerabilities.

Example 9 is an improved method of protecting a programmable device against malware, comprising: hooking a runtime layer used by a scripting language executable by a browser; recording at runtime scripting language execution events caused by execution of a script in the scripting language; transforming the recorded scripting language execution events into an execution trace; and analyzing the execution trace dynamically for vulnerabilities associated with execution of the script.

In Example 10 the subject matter of Example 9 optionally includes further comprising: informing a security software of the vulnerabilities.

In Example 11 the subject matter of any of Examples 9-10 optionally includes wherein hooking a runtime layer comprises: injecting code in the scripting language into scripts executed by the runtime layer.

In Example 12 the subject matter of any of Examples 9-10 optionally includes further comprising: providing an application programming interface for a security software; and delivering information about the vulnerabilities to the security software via the application programming interface.

In Example 13 the subject matter of any of Examples 9-10 optionally includes further comprising: employing a browser plugin interface to perform file-based analysis of vulnerabilities in the script.

In Example 14 the subject matter of any of Examples 9-10 optionally includes wherein analyzing the execution trace is performed external to the browser.

In Example 15 the subject matter of any of Examples 9-10 optionally includes wherein analyzing the execution trace comprises: comparing information in the execution trace to a database of known scripting language vulnerabilities.

In Example 16 the subject matter of Example 15 optionally includes wherein analyzing the execution trace further comprises: updating the database of known scripting language vulnerabilities by communicating with a remote server.

Example 17 is a programmable device programmed with an improved anti-malware protection system, comprising: a processing element; and a memory, coupled to the processing element, on which is stored is improved anti-malware protection software comprising instructions that when executed program the processing element to: hook a runtime layer used by a scripting language executable by a browser; record at runtime scripting language execution events caused by execution of a script in the scripting language; transform the recorded scripting language execution events into an execution trace; and analyze the execution trace dynamically for vulnerabilities associated with execution of the script.

In Example 18 the subject matter of Example 17 optionally includes wherein the instructions further comprise instructions that when executed program the processing element to: inform a security software of the vulnerabilities.

In Example 19 the subject matter of any of Examples 17-18 optionally includes wherein the instructions that when executed program the processing element to hook a runtime layer comprise instructions that when executed program the processing element to: inject code in the scripting language into scripts executed by the runtime layer.

In Example 20 the subject matter of any of Examples 17-18 optionally includes wherein the instructions further comprise instructions that when executed program the processing element to: provide an application programming interface for a security software; and provide information about the vulnerabilities to the security software via the application programming interface.

In Example 21 the subject matter of any of Examples 17-18 optionally includes wherein the instructions further comprise instructions that when executed program the processing element to: employ a browser plugin interface to perform file-based analysis of vulnerabilities in the script.

In Example 22 the subject matter of any of Examples 17-18 optionally includes wherein the instructions that when executed program the processing element to analyze the execution trace are configured for embedding in a security software external to the browser.

In Example 23 the subject matter of any of Examples 17-18 optionally includes wherein the instructions that when executed program the processing element to analyze the execution trace comprise instructions that when executed program the processing element to: compare information in the execution trace to a database of known scripting language vulnerabilities.

In Example 24 the subject matter of Example 23 optionally includes wherein the instructions that when executed program the processing element to analyze the execution trace further comprise instructions that when executed program the processing element to: update the database of known scripting language vulnerabilities.

Example 25 is an improved anti-malware protection system, comprising: means for hooking a runtime layer used by a scripting language executable by a browser; means for recording at runtime scripting language execution events caused by execution of a script in the scripting language; means for transforming the recorded scripting language execution events into an execution trace; and means for analyzing the execution trace dynamically for vulnerabilities associated with execution of the script.

In Example 26 the subject matter of Example 25 optionally includes further comprising: means for informing a security software of the vulnerabilities.

In Example 27 the subject matter of any of Examples 25-26 optionally includes wherein the means for hooking a runtime layer comprise: means for injecting code in the scripting language into scripts executed by the runtime layer.

In Example 28 the subject matter of any of Examples 25-26 optionally includes further comprising: means for providing an application programming interface for a security software; and means for providing information about the vulnerabilities to the security software via the application programming interface.

In Example 29 the subject matter of any of Examples 25-26 optionally includes further comprising: means for employing a browser plugin interface to perform file-based analysis of vulnerabilities in the script.

In Example 30 the subject matter of any of Examples 25-26 optionally includes wherein the means for analyzing the execution trace are configured for embedding in a security software external to the browser.

In Example 31 the subject matter of any of Examples 25-26 optionally includes wherein the means for analyzing the execution trace comprises: means for comparing information in the execution trace to a database of known scripting language vulnerabilities.

In Example 32 the subject matter of Example 31 optionally includes wherein the means for analyzing the execution trace further comprise: means for updating the database of known scripting language vulnerabilities.

Example 33 is a computer readable medium including code that when executed causes a machine to perform the method of any one of claims 9-16.

Example 34 is a computer readable medium on which is stored software for an improved anti-malware protection system, comprising instructions that when executed program a programmable device to: hook a runtime layer used by a scripting language executable by a browser; record at runtime scripting language execution events caused by execution of a script in the scripting language; transform the recorded scripting language execution events into an execution trace; analyze the execution trace dynamically for vulnerabilities associated with execution of the script; and inform a security software of the vulnerabilities.

In Example 35 the subject matter of Example 34 optionally includes wherein the instructions that when executed program the programmable device to hook a runtime layer comprise instructions that when executed program the programmable device to: inject code in the scripting language into scripts executed by the runtime layer.

In Example 36 the subject matter of any of Examples 34-35 optionally includes wherein the instructions further comprise instructions that when executed program the programmable device to: provide an application programming interface for a security software; and provide information about the vulnerabilities to the security software via the application programming interface.

In Example 37 the subject matter of any of Examples 34-36 optionally includes wherein the instructions further comprise instructions that when executed program the programmable device to: employ a browser plugin interface to perform file-based analysis of vulnerabilities in the script.

In Example 38 the subject matter of any of Examples 34-37 optionally includes wherein the instructions that when executed program the programmable device to analyze the execution trace comprise instructions that when executed program the programmable device to: compare information in the execution trace to a database of known scripting language vulnerabilities; and update the database of known scripting language vulnerabilities.

Example 39 is an improved method of protecting a programmable device against malware, comprising: hooking a runtime layer used by a scripting language executable by a browser; recording at runtime scripting language execution events caused by execution of a script in the scripting language; transforming the recorded scripting language execution events into an execution trace; analyzing the execution trace dynamically for vulnerabilities associated with execution of the script; and informing a security software of the vulnerabilities.

In Example 40 the subject matter of Example 39 optionally includes wherein hooking a runtime layer comprises: injecting code in the scripting language into scripts executed by the runtime layer.

In Example 41 the subject matter of any of Examples 39-40 optionally includes further comprising: providing an application programming interface for a security software; and delivering information about the vulnerabilities to the security software via the application programming interface.

In Example 42 the subject matter of any of Examples 39-41 optionally includes further comprising: employing a browser plugin interface to perform file-based analysis of vulnerabilities in the script.

In Example 43 the subject matter of any of Examples 39-42 optionally includes wherein analyzing the execution trace comprises: comparing information in the execution trace to a database of known scripting language vulnerabilities; and updating the database of known scripting language vulnerabilities by communicating with a remote server.

Example 44 is a programmable device programmed with an improved anti-malware protection system, comprising: a processing element; and a memory, coupled to the processing element, on which is stored is improved anti-malware protection software comprising instructions that when executed program the processing element to: hook a runtime layer used by a scripting language executable by a browser; record at runtime scripting language execution events caused by execution of a script in the scripting language; transform the recorded scripting language execution events into an execution trace; analyze the execution trace dynamically for vulnerabilities associated with execution of the script; and inform a security software of the vulnerabilities.

In Example 45 the subject matter of Example 44 optionally includes wherein the instructions that when executed program the processing element to hook a runtime layer comprise instructions that when executed program the processing element to: inject code in the scripting language into scripts executed by the runtime layer.

In Example 46 the subject matter of any of Examples 44-45 optionally includes wherein the instructions further comprise instructions that when executed program the processing element to: provide an application programming interface for a security software; and provide information about the vulnerabilities to the security software via the application programming interface.

In Example 47 the subject matter of any of Examples 44-46 optionally includes wherein the instructions further comprise instructions that when executed program the processing element to: employ a browser plugin interface to perform file-based analysis of vulnerabilities in the script.

In Example 48 the subject matter of any of Examples 44-47 optionally includes wherein the instructions that when executed program the processing element to analyze the execution trace comprise instructions that when executed program the processing element to: compare information in the execution trace to a database of known scripting language vulnerabilities; and update the database of known scripting language vulnerabilities.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory computer readable medium comprising instructions that, when executed, cause a programmable device to at least:
    hook a runtime layer used by a scripting language, the runtime layer to be executed by a browser;
    in response to a load of a plugin into the browser, generate an alert to notify a security software of the load of the plugin;
    in response to the alert, scan the plugin with the security software to determine whether the plugin is malicious;
    in response to a first determination that the plugin is malicious, disable the load of the plugin or a load of a script into the plugin; and
    in response to a second determination that the plugin is not malicious:
        intercept execution of an object including the script;
        load the script into the plugin to cause an execution of the script;
        record scripting language execution events at runtime, the scripting language execution events caused by execution of the script in the scripting language;
        transform the recorded scripting language execution events into an execution trace; and
        at least one of scan the script in the plugin to detect vulnerabilities associated with execution of the script or analyze the execution trace dynamically for the vulnerabilities.

2. The non-transitory computer readable medium of claim 1, wherein the instructions, when executed, cause the programmable device to:
    inform the security software of the vulnerabilities.

3. The non-transitory computer readable medium of claim 1, wherein the instructions, when executed, cause the programmable device to:
    inject code in the scripting language into scripts executed by the runtime layer.

4. The non-transitory computer readable medium of claim 1, wherein the instructions, when executed, cause the programmable device to:
    provide an application programming interface for the security software; and
    provide information about the vulnerabilities to the security software via the application programming interface.

5. The non-transitory computer readable medium of claim 1, wherein the plugin has a browser plugin interface, and the instructions, when executed, cause the programmable device to:
    employ the browser plugin interface to perform file-based analysis of the vulnerabilities in the script.

6. The non-transitory computer readable medium of claim 1, wherein the instructions, when executed, cause the programmable device to analyze the execution trace in the security software external to the browser.

7. The non-transitory computer readable medium of claim 1, wherein the instructions, when executed, cause the programmable device to:
    compare information in the execution trace to a database of known scripting language vulnerabilities.

8. The non-transitory computer readable medium of claim 7, wherein the instructions, when executed, cause the programmable device to:
    update the database of known scripting language vulnerabilities.

9. The non-transitory computer readable medium of claim 1, wherein the instructions, when executed, cause the programmable device to:
    deliver an encrypted object to the runtime layer, the encrypted object including the script;
    decrypt the encrypted object to expose the script for execution by the runtime layer;
    execute the script in the runtime layer to generate the scripting language execution events;
    scan the scripting language execution events based on a binary scan technique; and
    in response to detecting an exploit based on the scan, disable at least one of the runtime layer, the execution of the script, or a web application of the browser.

10. An improved method of protecting a programmable device against malware, comprising:
    hooking a runtime layer used by a scripting language, the runtime layer to be executed by a browser;
    in response to a load of a plugin into the browser, generating an alert to notify a security software of the load of the plugin;
    in response to the alert, scanning the plugin with the security software to determine whether the plugin is malicious;
    in response to a first determination that the plugin is malicious, disabling the load of the plugin or a load of a script into the plugin; and
    in response to a second determination that the plugin is not malicious:
        intercepting execution of an object including the script;
        loading the script into the plugin to cause an execution of the script;
        recording scripting language execution events at runtime, the scripting language execution events caused by execution of the script in the scripting language;
        transforming the recorded scripting language execution events into an execution trace; and at least one of scanning the script in the plugin to detect vulnerabilities associated with execution of the script or analyzing the execution trace dynamically for the vulnerabilities.

11. The method of claim 10, further including:
informing the security software of the vulnerabilities.

12. The method of claim 10, wherein hooking the runtime layer includes:
injecting code in the scripting language into scripts executed by the runtime layer.

13. The method of claim 10, further including:
providing an application programming interface for the security software; and
delivering information about the vulnerabilities to the security software via the application programming interface.

14. The method of claim 10, wherein the plugin has a browser plugin interface, and further including:
employing the browser plugin interface to perform file-based analysis of the vulnerabilities in the script.

15. The method of claim 10, wherein analyzing the execution trace is performed external to the browser.

16. The method of claim 10, wherein analyzing the execution trace includes:
comparing information in the execution trace to a database of known scripting language vulnerabilities.

17. The method of claim 16, wherein analyzing the execution trace further includes:
updating the database of known scripting language vulnerabilities by communicating with a remote server.

18. A programmable device programmed with an improved anti-malware protection system, comprising:
at least one memory;
instructions; and
at least one processing element to execute the instructions to:
hook a runtime layer used by a scripting language, the runtime layer to be executed by a browser;
in response to a load of a plugin into the browser, generate an alert to notify a security software of the load of the plugin;
in response to the alert, scan the plugin with the security software to determine whether the plugin is malicious;
in response to a first determination that the plugin is malicious, disable the load of the plugin or a load of a script into the plugin; and
in response to a second determination that the plugin is not malicious:
intercept execution of an object including the script;
load the script into the plugin to cause an execution of the script;
record scripting language execution events at runtime, the scripting language execution events caused by execution of the script in the scripting language;
transform the recorded scripting language execution events into an execution trace; and
at least one of scan the script in the plugin to detect vulnerabilities associated with execution of the script or analyze the execution trace dynamically for the vulnerabilities.

19. The programmable device of claim 18, wherein the at least one processing element is to:
inform the security software of the vulnerabilities.

20. The programmable device of claim 18, wherein the at least one processing element is to:
inject code in the scripting language into scripts executed by the runtime layer.

21. The programmable device of claim 18, wherein the at least one processing element is to:
provide an application programming interface for the security software; and
provide information about the vulnerabilities to the security software via the application programming interface.

22. The programmable device of claim 18, wherein the at least one processing element is to:
employ a browser plugin interface of the plugin to perform file-based analysis of vulnerabilities in the script.

23. The programmable device of claim 18, wherein the at least one processing element is to analyze the execution trace in the security software external to the browser.

24. The programmable device of claim 18, wherein the at least one processing element is to:
compare information in the execution trace to a database of known scripting language vulnerabilities.

25. The programmable device of claim 24, wherein the at least one processing element is to:
update the database of known scripting language vulnerabilities.

* * * * *